United States Patent [19]
Calvert et al.

[11] 4,108,196
[45] Aug. 22, 1978

[54] BALL VALVES

[75] Inventors: Michael Arnold Calvert, Kirkcaldy, Scotland; David Joseph Senger, Hammond, La.

[73] Assignee: TK Valve Limited, Dunfermline, Scotland

[21] Appl. No.: 748,905

[22] Filed: Dec. 9, 1976

[30] Foreign Application Priority Data

Nov. 13, 1976 [GB] United Kingdom ............... 47380/76

[51] Int. Cl.² ............................................. F16K 13/04
[52] U.S. Cl. ...................................... 137/72; 251/174
[58] Field of Search ...................... 137/72, 73, 74, 75; 251/171, 172, 174

[56] References Cited

U.S. PATENT DOCUMENTS

| 743,511 | 11/1903 | Huxley | 251/174 |
|---|---|---|---|
| 3,175,495 | 3/1965 | Anderson | 137/74 |
| 3,177,887 | 4/1965 | Priese | 137/74 |
| 3,346,234 | 10/1967 | Allen | 251/317 X |
| 3,472,270 | 10/1969 | Masheder | 251/172 X |
| 3,497,178 | 2/1970 | Priese | 251/174 |
| 3,618,627 | 11/1971 | Wagner | 137/73 |
| 3,695,579 | 10/1972 | Allen | 251/174 |
| 3,752,178 | 8/1973 | Grove | 251/174 X |
| 3,990,465 | 11/1976 | Allen | 251/174 X |

Primary Examiner—Harold W. Weakley
Attorney, Agent, or Firm—Lane, Aitken, Dunner & Ziems

[57] ABSTRACT

In a ball valve, springs urging opposed annular valve seats into engagement with the ball press against heat sensitive material, and bushes between trunnions and sockets in the ball are made of heat sensitive material, so that, in the event of fire reaching a ball valve in a pipeline, and the valve being closed, said heat sensitive material and said bushes disintegrate, and the ball is moved by fluid pressure relative to the trunnions in the downstream direction and pushes the downstream valve seat into sealing engagement with the valve housing.

14 Claims, 5 Drawing Figures

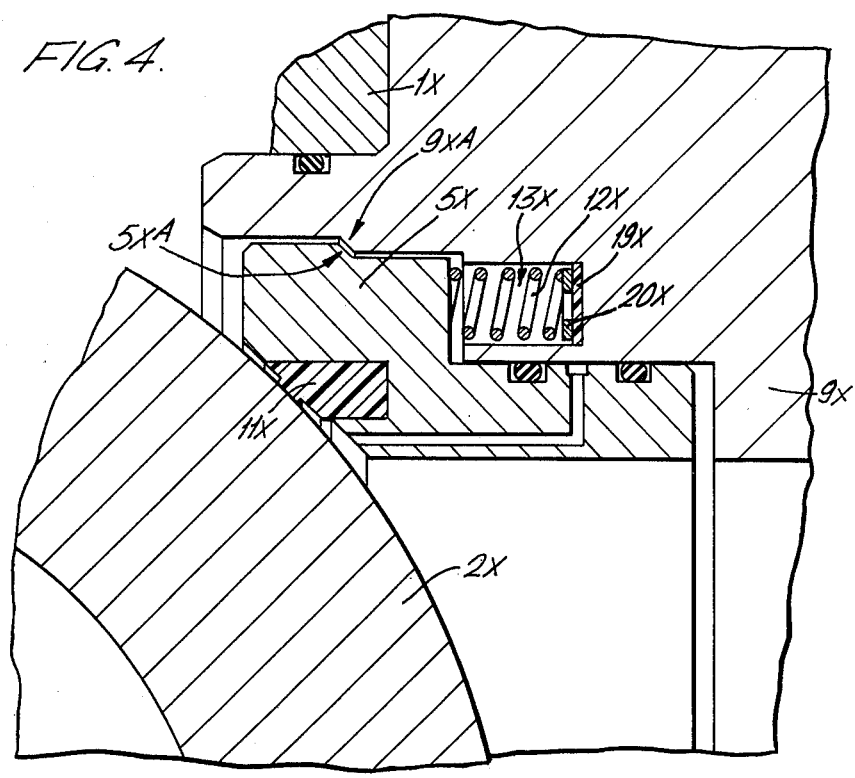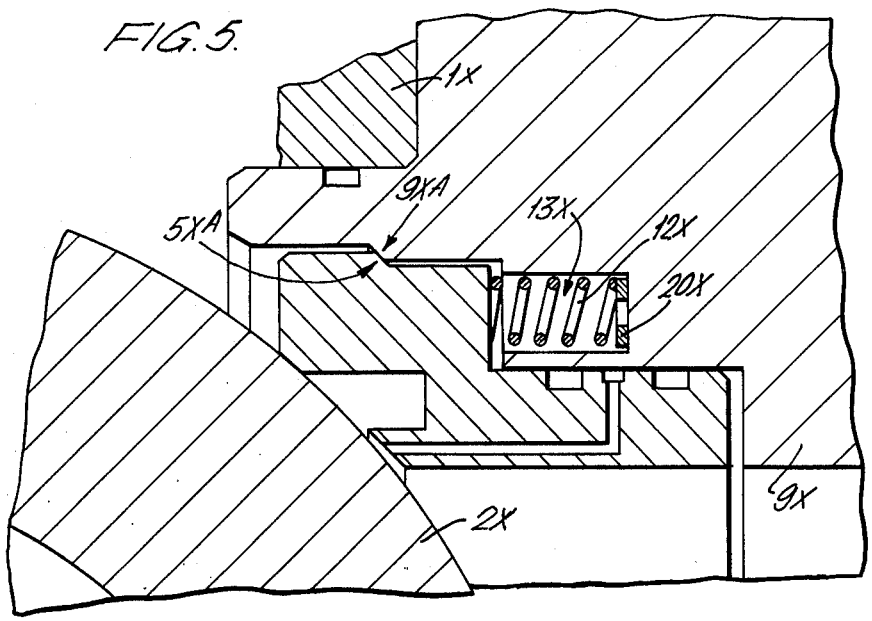

BALL VALVES

This invention relates to ball valves, especially for use between sections of pipe lines conducting inflammable fluids.

A ball valve consists generally of a valve housing, a valve ball in the housing turnable between open and closed positions, pipe connectors or so-called adaptors connected to opposite ends of the housing, and valve seats located in recesses in said adaptors and resiliently urged into sealing engagement with the ball. Seals in the form of O-rings are provided between the valve seats and the peripheral walls of said recesses in the adaptors, and the valve seats may carry non-metallic, for example nylon, sealing rings in engagement with the ball.

At present, if fire occurs, for example in a section of a pipe line on the upstream side of a ball valve, there is a disadvantage that closure of the valve does not normally prevent the spread of fire to the downstream side. The reason for this is that the said O-rings are destroyed and fluid can flow downstream between said valve seats and the walls of the recesses in the adaptors. If the valve seats carry non-metallic sealing rings, these are also destroyed, and a further or alternative passage for the fluid results.

An object of the present invention is to provide a ball valve in which said disadvantage is obviated or mitigated.

For convenience of description, the term "housing" will hereinafter be assumed to include said adaptors or similar pipe coupling means.

According to the present invention there is provided a ball valve, especially for use between adjacent sections of a pipe line conducting an inflammable fluid, said ball valve comprising a valve housing a valve ball in said housing and having a through-passage, a trunnion in said housing projecting into a first socket in said ball, a control shaft projecting into and drivingly engaging a second socket in said ball diametrally opposed to said first socket, a pair of annular valve seat members spaced axially of the pipe line, and spring means urging said seat members into sealing engagement with the ball; in which a heat-sensitive bush is provided between said trunnion and the peripheral wall of said first socket and between said control shaft and the peripheral wall of said second socket, and said spring means presses against heat-sensitive material; whereby, in the event of fire or excessive heat reaching a ball valve in a pipe line, and the valve is turned to its closed position, said bushes disintegrate, and said heat-sensitive material disintegrates so that the valve seat members are no longer spring urged, and the ball moves axially of the pipe line, under pressure of the fluid in the pipe line, and pushes the downstream valve seat member into sealing contact with the valve housing.

In the event that the valve seat members have non-metallic sealing rings, these also disintegrate, and the fluid pressure also urges the ball into metal-to-metal sealing contact with the valve seat member.

Preferably, said control shaft has an annular shoulder carrying a heat-sensitive thrust washer which disintegrates in the event of fire or excessive heat, and permits said shaft to move axially under pressure of the burning fluid and effect a seal between said shoulder and the housing.

The sealing rings, if provided, may be made, for example, of nylon, and the bushes may be made of glass fibre reinforced plastics material; or any other suitable heat-sensitive material may be employed in either case.

Further, according to the present invention there is provided, for use in a ball valve as aforesaid, an annular valve seat member having on a face axially opposed to its seat, spring means located in socket means, the spring means in its non-compressed condition having an axial length substantially no greater than the depth of the socket means and, within the socket means, spacing means made of heat-sensitive material causing the spring means to project from the socket means.

Still further, according to the present invention there is provided, for use in a ball valve as aforesaid, an annular valve seat member carrying on a face axially opposed to its seat, heat-sensitive material arranged to be abutted by said spring means, when the valve is assembled, and said spring means is carried by the housing.

Embodiments of the invention will now be described, by way of example, with reference to the accompanying drawings, in which:

FIGS. 4 and 5 are views corresponding respectively to FIGS. 2 and 3 and showing a modification.

Figure 1:
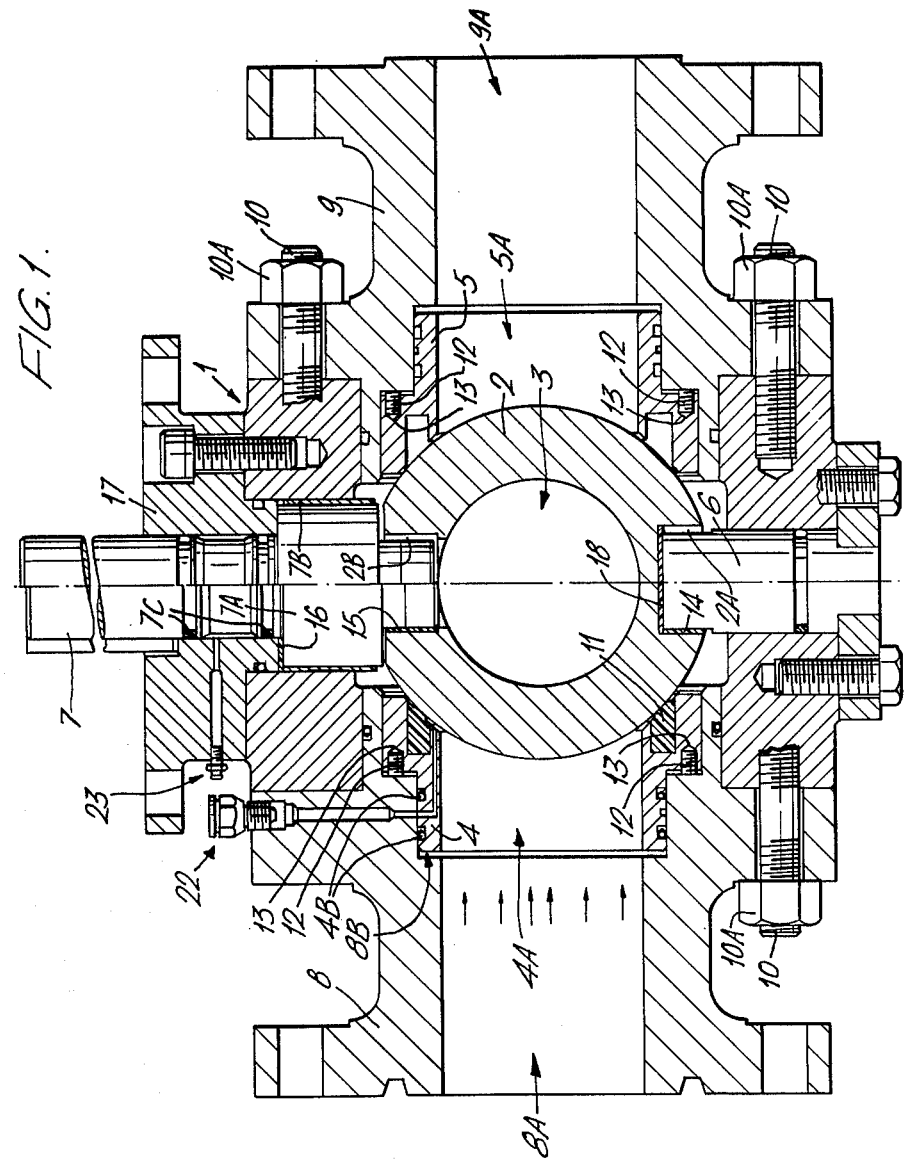
FIG. 1 is a sectional elevation of a ball valve according to the present invention, showing, on the left hand side of the centre line, the valve closed and in a condition prior to the occurrence of a fire, and, on the right hand side, the valve closed and in a condition after the occurrence of a fire.
Figure 2:
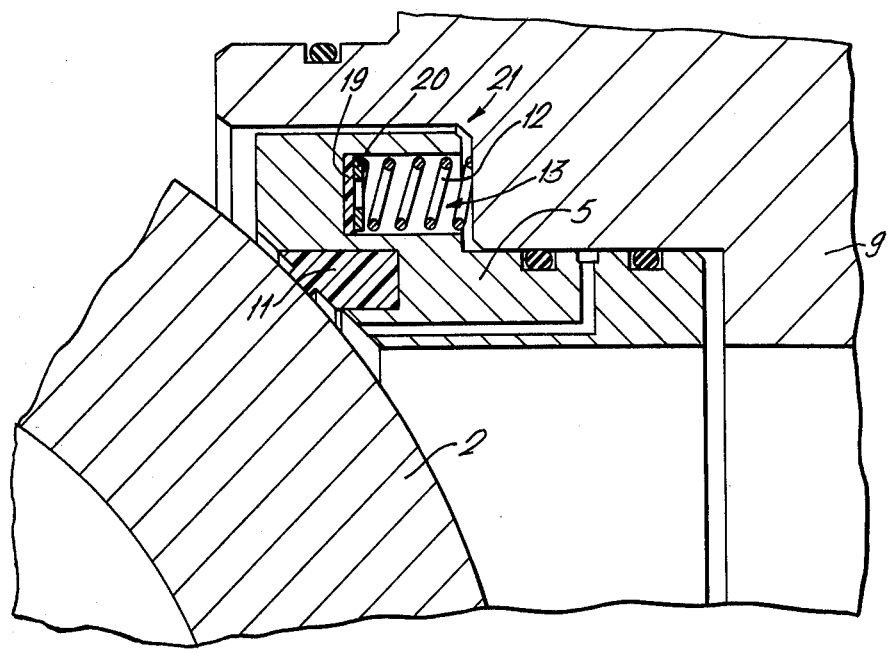
FIG. 2 is a fragmentary sectional view corresponding to FIG. 1, to a larger scale, and showing the ball and a valve seat in more detail and in a pre-fire condition.
Figure 3:
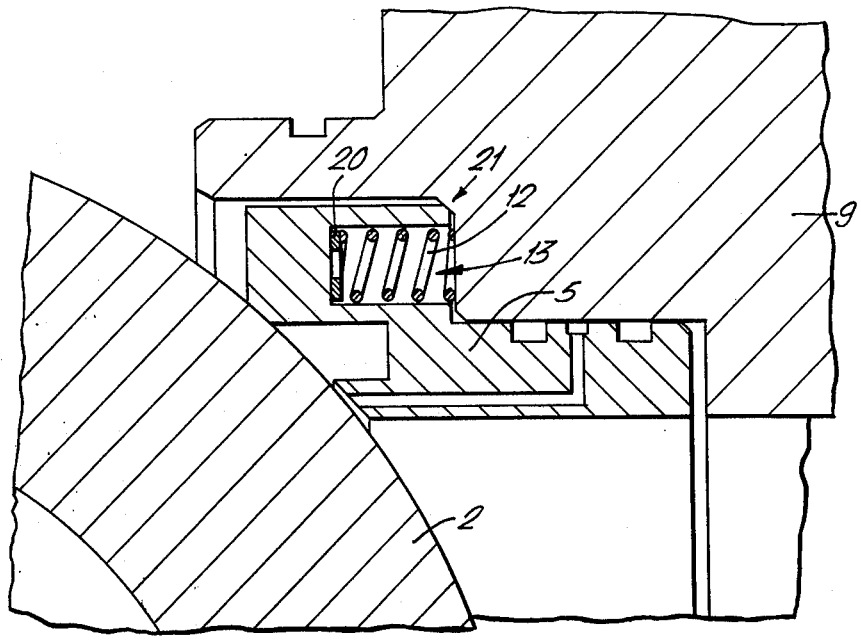
FIG. 3 is a view corresponding to FIG. 2 showing the ball and the valve seat in a post-fire condition.

Referring to FIGS. 1 to 3, a ball valve consists generally of a valve housing 1, a valve ball 2 having a through passage 3, valve seat members 4 and 5 upstream and downstream of the ball 2, a trunnion 6 on which the ball 2 is rotatably adjustable, and a control shaft 7 in driving connection with the ball 2 and turnable through gearing or by a wrench. As aforesaid, for convenience of description, it will be assumed that end pipe connectors or so-called adaptors 8 and 9 form part of the housing 1 to which they are connected by studs 10 and nuts 10A. The adaptors 8, 9 have, of course, passages 8A, 9A which are co-axial with passages 4A, 5A in the valve seats, and with the passage 3 in the ball 2 when the latter is in its open position.

The valve seat members 4 and 5 are identical and only the seat 4 will now be described. The valve seat member 4 carries in an annular recess on one end face a sealing ring 11, made of a heat-sensitive material such for example as nylon, which abuts the ball 2 and normally prevents the passage of fluid around the ball. The seat member has, on a face axially opposed to its seat, spring means in the form of an annular series of compression springs 12 located in socket means in the form of a corresponding series of sockets 13. The springs 12 project from the sockets 13 and abut a shoulder on the adaptor 8 and urge the seat into sealing contact with the ball through the intermediary of the sealing ring 11.

The upper end of the trunnion 6 projects into a socket 2A in the ball, and a bush 14 is provided between the trunnion 6 and the peripheral wall of the socket. In a similar manner, a bush 15 is provided between a lower end portion of the control shaft 7 and the peripheral wall of a socket 2B in the ball. The bushes 14 and 15 are made of heat sensitive material, such for example as glass fibre reinforced plastics material. The shaft 7 has an annular boss 7A, and a thrust washer 16 is provided between the boss 7A and a bonnet or closure cap 17. A thrust disc 18 is provided between the trunnion 6 and the base of the socket 2A. A metal bush 7B is provided between the peripheral face of the boss 7A and the housing 1. The washer 16 is made of heat sensitive material, such for example as nylon or any other suitable plastics material.

Keeping in mind that the valve seats 4 and 5 are substantially identical, further details will now be given with reference to the valve seat 5 as shown in FIGS. 2 and 3. As previously explained, each spring 12 is in compression and urges the seat towards the ball. Each spring 12, when in a non-compressed condition, has an axial length substantially no greater than the length of the socket 13. Within the latter, spacing means in the form of a spacing element 19 made of heat sensitive material, for example, nylon, abuts the base of the socket 13, and a metal washer 20 may, as shown, be located between the element 19 and the adjacent end of the spring 12. In this embodiment, therefore, the combined axial length of the spring 12 (when non-compressed) and the washer 20 is no greater than the length of the socket 13.

In the event of fire occurring in the region of the valve, the following conditions arise, it being assumed for convenience of description that fluid on the upstream side of the ball 2 has ignited.

O-rings 4B between the valve set 4 and the peripheral wall of a recess 8B in the adaptor 8, and the sealing ring 11 in the valve seat 4 disintegrate due to the fire or the heat from the fire. The burning fluid, hot gases of combustion or conducted heat thus flows past the seat member 4, and around the ball 2, and the bushes 14, 15, the sealing ring 11 in the valve seat member 5, and the spacing elements 19 in the sockets 13 in the valve seat member 5, thus, disintegrate.

Thus under the upstream pressure of the fluid, the ball 2 can move a short distance downstream relative to the housing and to the trunnion 6 and to the control shaft 7. A metal-to-metal seal is thus attained between the ball and the seat of the member 5. As the spacing elements 19 have been destroyed, the springs 12 are no longer compressed, so that the ball 2 also pushes the valve seat member 5 into sealing contact with the shoulder on the adaptor 9, as shown best in FIG. 3. Thus, the flow of fluid past the ball 2 to its downstream side is prevented. With a view to increasing the effectiveness of this sealing, the corresponding corners of the valve seat member 5 and the adaptor 9 are chamfered, as shown at 21, and the corner of the valve seat which engages the ball is also chamfered. Due to the destruction of the thrust washer 16 also the control shaft 7 can move upwards, and is forced upwards by fluid pressure on the underface of the boss 7A, thus effecting a metal-to-metal seal between the upper face of the boss 7A and the housing, so that the escape of fluid upwardly is also prevented, though the O-rings 7C have also disintegrated.

In the modification shown in FIGS. 4 and 5, in which like parts are referenced by like numerals with the suffix X, the sockets 13X, instead of being provided in the valve seat member 5X, are provided in the adaptor 9X, and the projecting ends of the springs 12X abut an annular shoulder on the adaptor 5X. In this case, the metal-to-metal seal is effected between an annular chamfered shoulder 5XA on the valve seat 5X and a chamfered step 9XA on the adaptor 9X.

In a further modification, not shown, the spacing elements 19 in FIG. 2 are omitted, and are replaced by an annular spacing element made of heat sensitive material on the shoulder of the adaptor 9, and the ends of the springs 12 abut said spacing member. Instead of an annular spacing member, there may be an annular series of spacing elements, one for each spring.

In a still further and similar modification, not shown, the spacing elements 19X in FIG. 4 may be replaced by an annular spacing element on the shoulder of the valve seat 5X, or by an annular series of spacing elements, one for each opening.

The said element or elements may be located in a recess or recesses in said shoulder of each valve seat.

In a still further modification, which is applicable to both of the above described embodiments, the annular series of sockets and springs is replaced respectively by an annular socket and a Belleville spring or similar spring means.

Various other modifications may be made without departing from the scope of the invention. For example, while nylon and glass fibre impregnated plastics materials have been given as examples of suitable heat sensitive materials, it is to be understood that any other material may be used which is suitable for forming seals, bushes, thrust washers, and spacing elements, as long as such materials fail in their function under fire, hot gases, or heat conducted as a result of fire. The failure may be due to melting, disintegration, or even evaporation of the materials under heat, such failure being sufficient to permit displacement of the valve ball and seat as above described.

As may be seen from the drawings, the valve has a number of other sealing rings which may be made of heat sensitive materials, but these need not be described, as they do not form part of the present invention.

In FIG. 1 of the drawings, the reference numeral 22 indicates, generally, a secondary sealant system for the seal 4, and the numeral 23 indicates a similar system for the control shaft 7.

It is to be understood that, if the fluid flow is in the opposite direction to that described, that is from right to left in FIG. 1, the same sealing effect as above described is achieved between the ball 2, the valve seat 4, and the adaptor 8, in the event of fire occurring on the right-hand side of the ball in FIG. 1.

It is also to be understood that when the valve seat members do not carry heat destructable sealing rings, there are metal-to-metal seals between the valve seats and the ball. In this case, in the event of fire or excessive heat, said metal-to-metal seals remain intact, but fluid can still pass, from one side of the ball to the other, between the valve seat member 4 and the peripheral wall of the recess therefor in the adaptor 8, due to disintegration of the O-rings. However, the conditions arising in the valve in the event of fire, as above described, otherwise remain the same.

We claim:

1. A ball valve, especially for use between adjacent sections of a pipe line conducting an inflammable fluid, said ball valve comprising a valve housing a valve ball in said housing and having a through-passage, a trunnion in said housing projecting into a first socket in said ball, a control shaft projecting into and drivingly engaging a second socket in said ball diametrically opposed to said first socket, a pair of annular valve seat members made of metal and spaced axially of the pipe line, and spring means urging said seat members into sealing engagement with the ball; in which a heat-sensitive bush is provided between said trunnion and the peripheral wall of said first socket and between said control shaft and the peripheral wall of said second socket, and said spring means presses against heat-sensitive material; whereby, in the event of fire or excessive heat reaching a ball valve in a pipe line, and the valve is turned to its closed position, said bushes disintegrate, and said heat-sensitive material disintegrates so that the valve seat members are no longer spring urged, and the ball moves axially of the pipe line, under pressure of the fluid in the pipe line, and pushes the downstream valve seat member into sealing contact with the valve housing.

2. A ball valve as claimed in claim 1, in which said control shaft has an annular shoulder carrying a heat-sensitive thrust washer which disintegrates in the event of fire or excessive heat, and permits said shaft to move axially under pressure of the fluid and effect a seal between said shoulder and the housing.

3. A ball valve as claimed in claim 1, in which, in each valve seat member, said spring means is located in socket means in the valve seat member.

4. A ball valve as claimed in claim 3, in which said heat-sensitive material is located between the spring means and the base of the socket means.

5. A ball valve as claimed in claim 3, in which said heat-sensitive material is located on a shoulder in the housing.

6. A ball valve as claimed in claim 1, in which, in each valve seat member, said spring means is located in socket means in a shoulder of the housing.

7. A ball valve as claimed in claim 6, in which said heat-sensitive material is located between the spring means and the base of the socket means.

8. A ball valve as claimed in claim 6, in which said heat-sensitive material is located on a shoulder of the valve seat member.

9. A ball valve as claimed in claim 3, in which said spring means comprises an annular series of compression springs, and said socket means comprises a corresponding series of sockets.

10. A ball valve as claimed in claim 1, in which said sealing contact is effected between corresponding chamfered faces on the valve seat member and on the valve housing.

11. A ball valve as claimed in claim 1, in which each valve seat member carries a sealing ring made of heat-sensitive material and engaging the valve ball.

12. A ball valve as claimed in claim 11, in which the face of each valve seat member which effects sealing contact with the valve ball when said sealing ring disintegrates is chamfered so as to increase the sealing effect.

13. A ball valve as claimed in claim 1, in which said bushes are made of glass fibre reinforced plastics material, and said heat sensitive material is nylon.

14. A ball valve as claimed in claim 12, in which said sealing rings are made of nylon.

* * * * *